(12) United States Patent
Fu

(10) Patent No.: US 8,555,157 B1
(45) Date of Patent: Oct. 8, 2013

(54) DOCUMENT UPDATE GENERATION

(75) Inventor: Xiaodong Fu, Sammamish, WA (US)

(73) Assignee: Google Inc., Mountain View, CA (US)

( * ) Notice: Subject to any disclaimer, the term of this patent is extended or adjusted under 35 U.S.C. 154(b) by 250 days.

(21) Appl. No.: 13/010,905

(22) Filed: Jan. 21, 2011

Related U.S. Application Data

(60) Provisional application No. 61/297,232, filed on Jan. 21, 2010.

(51) Int. Cl.
*G06F 12/14* (2006.01)

(52) U.S. Cl.
USPC ........................ 715/234; 715/201; 715/229

(58) Field of Classification Search
USPC .................... 715/200, 201, 229, 234
See application file for complete search history.

(56) References Cited

U.S. PATENT DOCUMENTS

| | | | |
|---|---|---|---|
| 6,317,754 B1* | 11/2001 | Peng | 707/610 |
| 7,818,659 B2* | 10/2010 | Kahn et al. | 715/203 |
| 2003/0041304 A1* | 2/2003 | Numata et al. | 715/513 |
| 2005/0039135 A1* | 2/2005 | Othmer et al. | 715/774 |
| 2006/0271787 A1* | 11/2006 | DeYoung et al. | 713/176 |
| 2008/0034282 A1* | 2/2008 | Zernik | 715/229 |
| 2010/0082745 A1* | 4/2010 | Davis et al. | 709/204 |
| 2010/0095129 A1* | 4/2010 | Wilson | 713/187 |
| 2011/0029634 A1* | 2/2011 | Gimson et al. | 709/217 |

OTHER PUBLICATIONS

Website: http://www.trackengine.com/servlets/com.nexlabs.trackengine.ui.Login., NexLabs Pte Ltd., Copyright 2000-2011., Accessed Nov. 4, 2011., 9 pages.
Nanno, et al., "HTML2RSS: Automatic Generation of RSS Feed based on Structure Analysis of HTML Document"., WWW 2006, May 22-26, 2006, Edinburgh, Scotland, 2 pages.

* cited by examiner

*Primary Examiner* — Stephen Hong
*Assistant Examiner* — Gregory J Vaughn
(74) *Attorney, Agent, or Firm* — Fish & Richardson P.C.

(57) ABSTRACT

Methods, systems, and apparatus, including computer programs encoded on a computer storage medium, for document update generation. In one aspect, a method includes identifying pairs of content nodes where a first content node in each pair is in a first hierarchical representation of a first document and a second content node in each pair is in a second hierarchical representation of a second document, in which the content nodes represent visible content and in which identifying comprises selecting the first and second content nodes such that a cost based on structural differences between the first and second hierarchical representations and a content difference between the first and second content nodes is minimized; associating rendered layout information related to the first content node with the second content node; and determining whether to generate a snippet for the content difference between the first and second content nodes based on the rendered layout information.

27 Claims, 4 Drawing Sheets

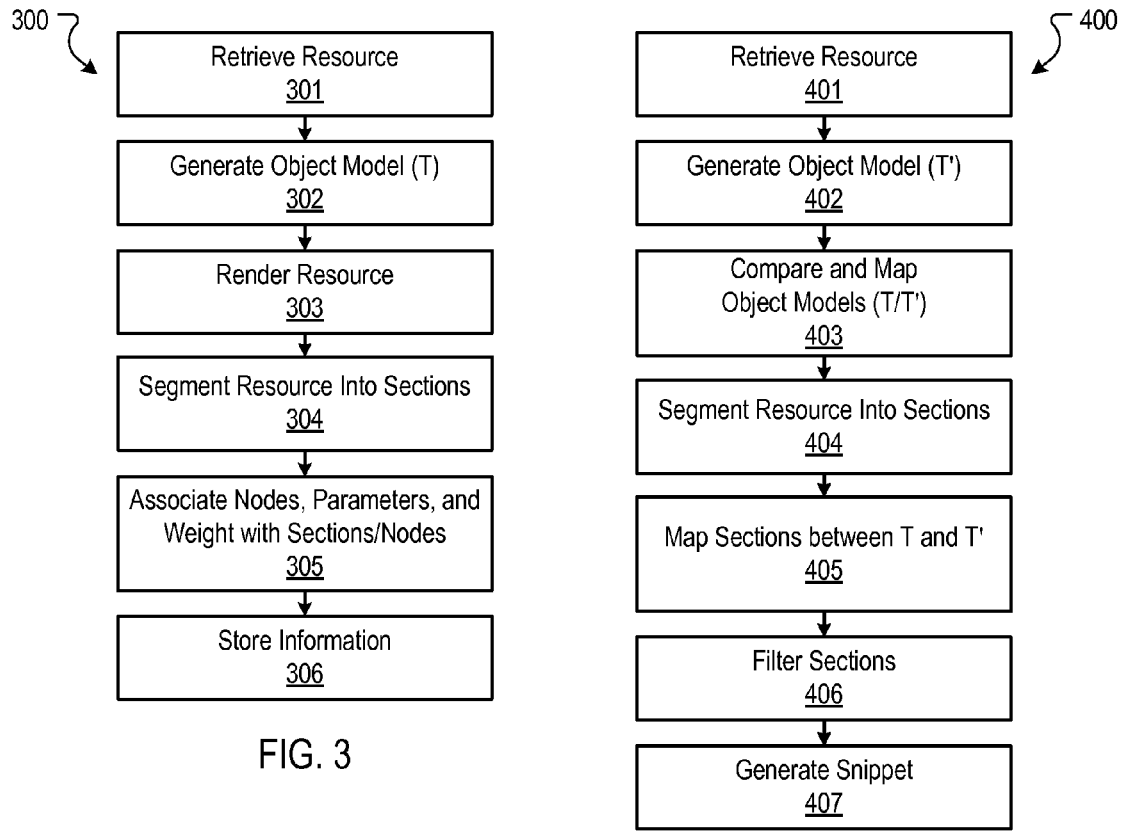
FIG. 3
FIG. 4
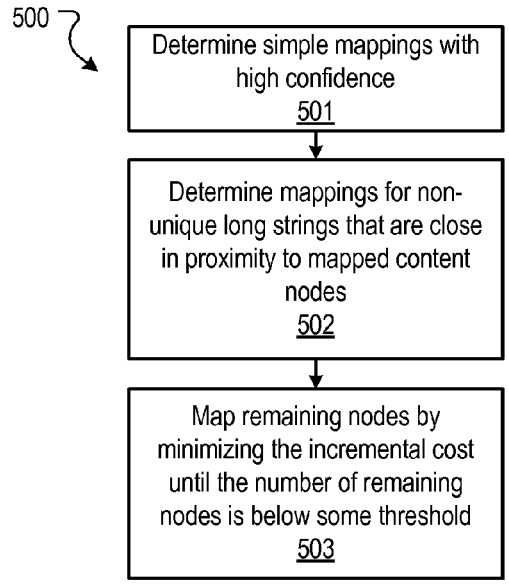
FIG. 5

DOCUMENT UPDATE GENERATION

CROSS-REFERENCE TO RELATED APPLICATIONS

Under 35 U.S.C. §119, this application claims benefit of U.S. Provisional Application Ser. No. 61/297,232, filed Jan. 21, 2010, the entire contents of which are hereby incorporated by reference.

BACKGROUND

This specification relates to identifying updates to documents.

Really Simple Syndication (RSS) is a collection of web feed formats used to publish frequently updated works—such as blog entries, news headlines, audio, and video—in a standardized format. RSS typically requires authors of web pages to specify how to produce content using various tools. Web page changes may also be tracked using online services which typically provide a simple, mechanical Hypertext Markup Language (HTML) difference between web page changes without filtering irrelevant changes such as timestamps, click number, advertisements, and navigation sections.

SUMMARY

Systems, methods, and apparatus including computer program products for document update generation techniques are disclosed in which an importance score is associated with content provided by a first document based, at least in part, on page layout information detected after rendering the first document. A second document is then compared and mapped with the first document to determine the importance scores of sections containing updated content in the second document (for example, by associating rendered layout information of the first document with sections in the second document) and to determine whether to generate a snippet containing the updated content without rendering the second document.

In general, one innovative aspect of the subject matter described in this specification can be embodied in methods that include the actions of identifying pairs of content nodes where a first content node in each pair is in a first hierarchical representation of a first document and a second content node in each pair is in a second hierarchical representation of a second document, in which the content nodes represent visible content and in which identifying comprises selecting the first and second content nodes such that a cost based on structural differences between the first and second hierarchical representations and a content difference between the first and second content nodes is minimized; associating rendered layout information related to the first content node with the second content node; and determining whether to generate a snippet for the content difference between the first and second content nodes based on the rendered layout information. Other embodiments of this aspect include corresponding systems, apparatus, and computer programs, configured to perform the actions of the methods, encoded on computer storage devices.

These and other embodiments can each optionally include one or more of the following features. Generating a snippet for the content difference between the first and second content nodes based on the rendered layout information. Identifying the pairs of content nodes can include: determining a first distance between the first content node and a neighboring content node having a corresponding paired node in the second hierarchical representation; determining a second distance between the second content node and the paired node; and calculating an incremental cost based on a difference between the first distance and the second distance in combination with the content difference. The second content node can be selected from a group of content nodes within a third distance from the paired node, and identifying the pairs of content nodes further comprises determining the incremental cost is less than incremental costs associated with other content nodes within the group of content nodes. Minimizing the cost can include: determining multiple incremental costs, each based on pairing an unmapped content node of the first hierarchical representation with an unmapped content node of the second hierarchical representation, the unmapped content nodes of the first and second hierarchical representations being within a distance of corresponding content nodes of an identified pair; and mapping the unmapped content node of the first hierarchical representation with the unmapped content node of the second hierarchical representation if the pairing results in a minimum incremental cost. The second document can be a version of the first document. A hierarchical representation can be a document object model. The rendered layout information associated with the first content node can include an assigned weight value derived from rendering the first document, the weight value satisfying a threshold criterion. The actions can include determining an assignment between groups of content nodes in the first hierarchical representation and groups of nodes in the second hierarchical representation using the Hungarian algorithm. The rendered layout information can be an importance score associated with a group of nodes to which the first content node belongs, and the actions can include deriving the importance score based on visual layout information related to a rendering of the first document, query information associated with the first document, or a combination thereof.

Particular embodiments of the subject matter described in this specification can be implemented so as to realize one or more of the following advantages. The important updates on a web page are detected. A human-readable feed that summarizes content changes is generated. A generated feed is relevant to the document content and user interest, allows a user to find updates in a document in a reasonable amount of time, and is highly readable (e.g. provides enough context information). Feeds can be ranked according to importance of the document changes they represent so that users can selectively read subsets of the feed.

The details of one or more embodiments of the subject matter described in this specification are set forth in the accompanying drawings and the description below. Other features, aspects, and advantages of the subject matter will become apparent from the description, the drawings, and the claims.

DESCRIPTION OF THE DRAWINGS

FIGS. 3 and 4 are flow diagrams of example techniques that enable the detection of updated content in resources.

FIG. 5 illustrates an exemplar technique for mapping content nodes of two DOM trees.

DETAILED DESCRIPTION

In the description below, for the purposes of explanation, specific examples related to detecting updated content in web pages, determining the importance of the updated content, and generating a web feed have been set forth in order to provide a thorough understanding of the implementations of the subject matter described in this specification. It is appreciated that the implementations described herein can be utilized in other capacities as well and need not be limited to web feeds and/or web resources. For example, implementations may be used to detect updated content related to other resources, including, for example, word processing documents, and portable document format (PDF) documents, images, videos, and/or to generate content signals for other purposes, including, for example, managing mirrored resources, extracting data from multiple resources, consolidating and/or compressing web archive data, indexing content related resources. Accordingly, other implementations are within the scope of the claims.

Figure 1:
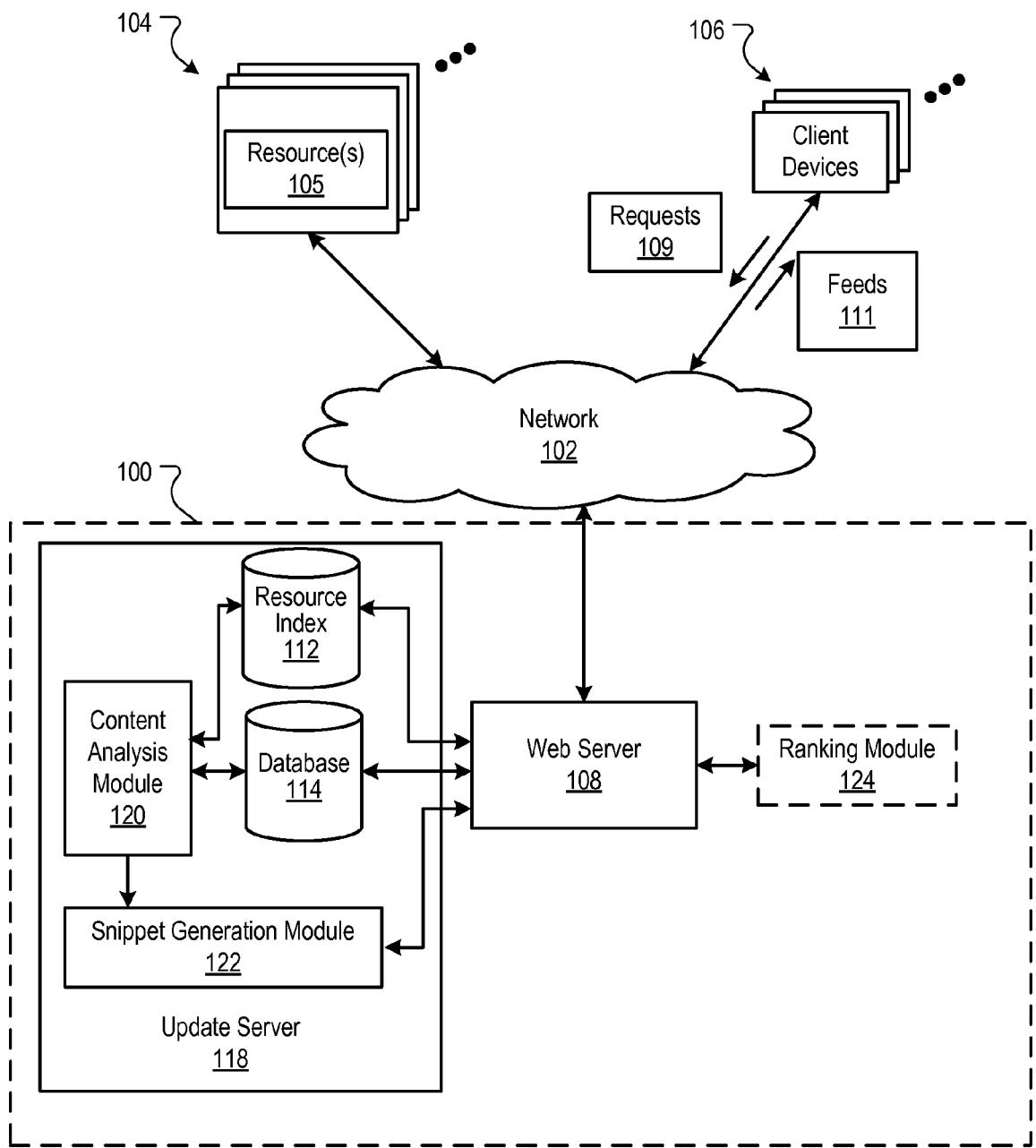
FIG. 1 is a block diagram of an exemplar system for generating web feeds.

FIG. 1 is a block diagram of an exemplar feed generation system 100 that generates web feeds 111 for client devices 106 in response to a request 109, e.g., a subscription. A network 102, e.g., the Internet, connects websites 104, client devices 106, and the feed generation system 100.

The website 104 includes one or more resources 105 associated with a domain name and hosted by one or more servers. An example website is a collection of web pages formatted in hypertext markup language (HTML) that can contain text, images, multimedia content, and programming elements, e.g., scripts. Each website 104, for example, is maintained by a publisher, e.g., an entity that manages and/or owns the website.

A resource 105 is any data that can be provided by a website 104 or by a process such as an executing software program, for example, over the network 102 and that is associated with a resource address such as a Uniform Resource Locator (URL), for instance. A resource can be provided in one or more pieces (e.g., file fragments) or as a stream. Resources 105 include HTML pages, eXtensible Markup Language (XML) documents, word processing documents, PDF documents, images, video, and feed sources, to name just a few. Resources 105 can include content, e.g., words, phrases, and images and may include embedded information (e.g., meta information and hyperlinks or "links") and/or embedded instructions (e.g., JavaScript scripts).

A client device 106 is an electronic device capable of requesting and receiving resources 105 over network 102. Example client devices 106 include personal computers, mobile communication devices, smart phones, server systems, and other devices that can send and receive data over network 102. Client device 106 typically includes a user application, e.g., a web browser, to facilitate the sending and receiving of data over network 102 and/or a web server application for re-publishing the data, e.g., for use by other client devices 106.

In general, client devices 106 submit requests 109 to feed generation system 100. In response, web server 108 accesses resource index 112 (e.g., provides the request to update server 118) to identify resources 105 that are related to request 109 and provide a feed 111 including, for example, ranked and filtered snippets. An example feed 111 can include a web page title, a snippet of text from updated portions of the web page, a portion of an image extracted from the web page, or a frame of a video, and the uniform resource locator (URL) of the web page. Other information may also be included.

As described in more detail below, feed generation system 100 detects important content changes and can, thus, be scaled to handle increasing work loads. After identifying the important content changes, system 100 generates human-readable snippets that summarize the content changes and, in some implementations, ranks the snippets so that users can selectively read or receive subsets of the feed. In some implementations, a ranking module 124 ranks the contextually rich snippets received from update server 118 prior to providing feed 111 to client devices 106. In some examples, ranking is implemented in snippet generation module 122 as described in more detail below. By filtering insignificant content changes and ranking the snippets, feed generation system 100 may improve user satisfaction by providing feeds relevant to user interests, allowing users to find updates in the resource more quickly, and/or by providing highly readable snippets (e.g. via contextual information included with the updated content).

To facilitate the detection and processing of updated content, feed generation system 100 identifies resources 105 by crawling and indexing resources 105 provided by websites 104 or other processes. A content analysis module 120 identifies and filters updated content in each resource to detect important updates on the web page. The importance of the update is determined based on one or more signals derived, generated and/or collected by content analysis module 120 based on previous versions of the resource or on a comparison between an earlier version and a current version of the resource. Resource related information used to derive or generate one or more of the signals is stored, e.g., in resource index 112, database 114, or other storage and includes, for example, information related to rendered features of an earlier version of the resource and information related to prior user interactions with the resource.

The information related to prior user interactions with the resource includes, for example, the most popular query terms used to identify the resource during a web search (excluding low Inverse Document Frequency (IDF) terms), aggregated click ratios for links on the page, or combinations of these. Other information related to prior user interactions is possible.

The information related to rendered features of the resource includes, for example, overall page layout characteristics, section level attributes, content signals, or combinations of these. Other information related to rendered features is possible. Overall page layout characteristics include, for example, overall page width/height, column data (e.g., number of columns, column height, the size of the largest cell within the corresponding column), regular text size and anchor size within the page, the size of the visually most predominant sections within the page, if any exist. Section level attributes include, for example, the layout category of the corresponding section (e.g., left/right sidebar, header, footer, body, regular box), geometric parameters (e.g., x and y coordinates, width, height), a list of the most significant html text tags within the section (e.g., header, body), the relative ratio of the geometric parameters of the section to the biggest cell vertically and/or the biggest cell horizontally, whether the section is visually the most predominant section within the page, the regular text size and anchor size within the section. Section level content signals include, for example, a count of the most popular query terms hitting the page contained within the section, an aggregated click ration for links within the section, and so on.

In various implementations, database 114 also stores query related information submitted during user query sessions (e.g., search terms used to identify the page). Selection data specifying actions taken in response to providing and rendering the resource are also stored in a data store such as database 114. These actions can include whether content (e.g., a link on a webpage) was selected, and subsequent actions taken by the user. User actions indicating selection of content include a mouse click, a finger gesture on a touch-sensitive surface, a speech command to a microphone, or by way of another input device, for example, in order to play the video or audio resources identified in the resource, listen to speech synthesized text in the resource, view text or multimedia content identified in the resource. Subsequent actions include, for example, navigating away from the content, accessing the content until completely presented.

Figure 2:
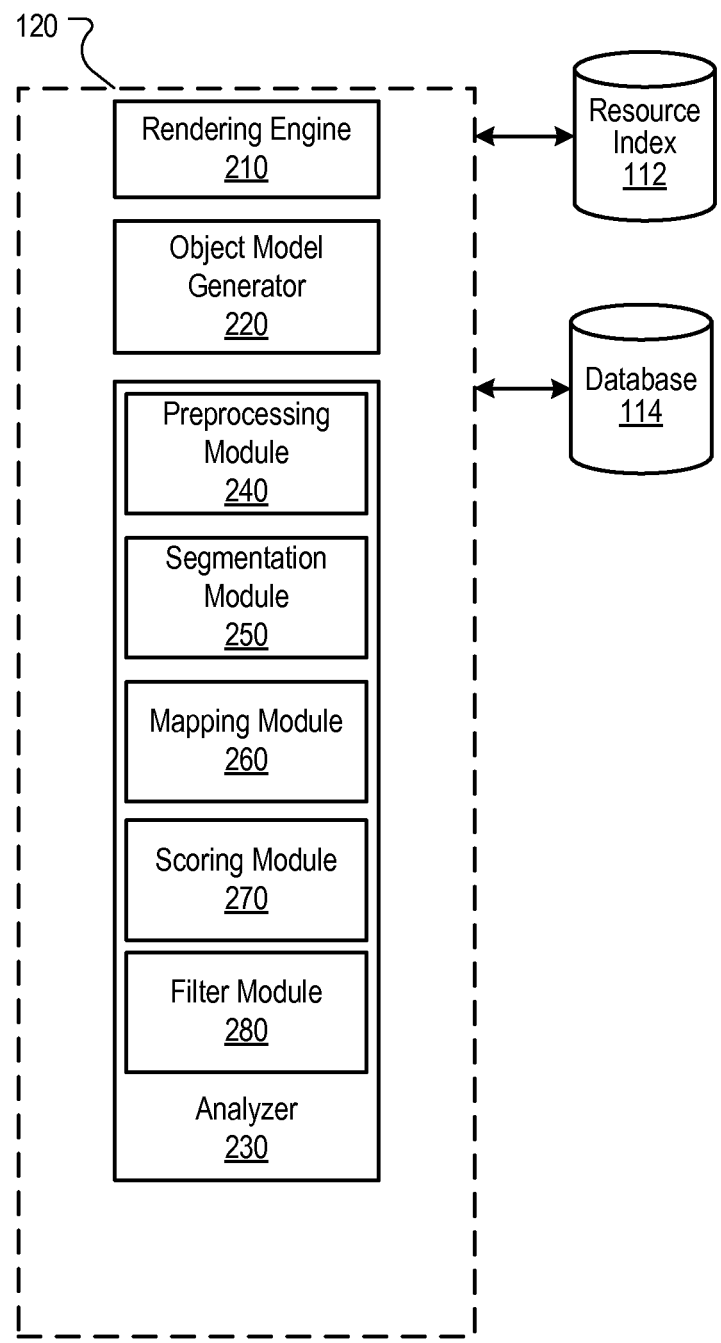
FIG. 2 illustrates an exemplar content analysis module.

FIG. 2 illustrates an exemplar content analysis module 120 in greater detail. Module 120 includes a rendering engine 210, an object model generator 220, and a content analyzer 230. Rendering engine 210 (e.g., a web browser) renders resource 105 so that rendering information, for example, page layout characteristics and section attributes, can be determined and stored for use with other versions of resource 105 without re-rendering the resource. Object model generator 220 generates an object model of resource 105, such as, for example, an HTML Document Object Model (DOM). In some implementations, the object model is represented by a DOM tree (T) showing the various elements of the resource in a hierarchical arrangement of interconnected nodes. For example, for web page resources, the DOM tree contains all information of a single web page, including content, structure, and presentation information. A typical DOM tree consists of three different types of nodes: elements, attributes, and text. Among them, an element node has a name and may consist of an ordered list of sub-elements, a list of unordered attribute nodes, and text nodes. An attribute node is a leaf node with key/value pairs. A text node is also a leaf node that has only a text value.

Once rendered, segmentation module 250 in content analyzer 230 partitions or segments the content within resource 105 into sections. In some implementations, the content is segmented using a set of heuristic rules (e.g., rules based on the use of html tags embedded in the content) or other unsupervised technique to group semantically similar sections together. For example, content from a news resource may be segmented into a latest news section, a front page section, an advertisement section, a hot topic section, and a footer section based on similarities in HTML tags and various common patterns in HTML documents.

Once segmented, content analyzer 230 determines one or more signals based on the visual layout including, for example, the overall page width/height, section level width/height, whether the resource contains a prominent section, the ratio between regular text size and anchor text within the page, and for vertically aligned sections, the number of total columns, the width of each column, and each column's parameters (e.g., overall height of column, largest cell within the colum). These and other signals are used to determine the relative importance of each section and/or the resource. For example, the ratio between regular text size and anchor text within a webpage is typically useful in distinguishing a portal page (where most of the page content consists of anchors) from a regular page (where most of the content consists of text/images).

In determining the relative importance of each section, content analyzer 230 first identifies noisy page sections, such as, headers/footers, navigation bars, and advertisement blocks that are updated frequently without affecting the content provided by the web page. For example, in some implementations, a set of heuristic rules is used to identify a header/footer based on section height, left/right side bars based on section widths, horizontal navigation bars based on the anchor ratio of the section as compared to the overall page level value, vertical navigation bars based on the ease of aligning multiple sections vertically, and advertisement blocks based on compliance with the Interactive Advertising Bureau (IAB) standards and guidelines.

Once the noisy page sections have been identified, scoring module 270 calculates a visual importance score for each section (including noisy page sections) based on one or more of a position score, an area score, a shape score, a vertical importance score, a horizontal importance score, and a content score. The position score is based on a predefined function to represent the relative importance of each pixel's x-y coordinate position within the rendered area. For example, pixels located near an edge of a rendered area are assigned a low score, while pixels located near the center of the rendered area are assigned high scores. Scoring module 270 determines the position score of each section based on the x-axis importance score and y-axis importance score for pixels within the corresponding section, for example, by taking the product of the two scores and then calculating a sum, an average, or a maximum of the pixel importance scores within the section or a subset of the pixel importance scores. In some examples, scoring module 270 associates an area score with each section based on the relative size of the section such that sections occupying larger areas receive higher area scores. For example, a section having a section width greater than 50% of the overall page width and a section height greater than 50% of the overall page height indicates the section is a predominant section within the page and is, therefore, likely to be more important than a section having a much smaller height ratio located at the bottom of the page (e.g., a footer section). Further, in some examples, scoring module 270 associates a shape score with each section based on a premise that visually attractive sections fall within a narrow range of height/width ratios such that outside that range, the section is easily ignored (e.g., a narrow bar). The ratio is determined, for example, by calculating (max(width, height)/min(width, height)). Still further, in some instances, scoring module 270 calculates a vertical importance score, a horizontal importance score, and/or a content score for each section. The vertical importance score is determined based on the ratio of the section height versus the height of the biggest cell in the same column. The horizontal importance score is determined based on the ratio of the section width versus the width of the widest column horizontally. The content score is based on, for example, the word count, font size, average sentence length, or other text based characteristics of the corresponding section and a weight associated with the most significant html tag.

In some implementations, query related scores for each section are determined to indicate the relative importance of the section with respect to other sections in resource 105. The query related scores are determined based on query information derived from prior user interactions with the resource and/or similar resources. As described above, prior user interactions include, for example, the most popular query terms used to identify the resource during a web search (excluding low Inverse Document Frequency (IDF) terms), the presence of those query terms within each section, aggregated click ratios for links within each section of the page, or combinations of these. Other information related to prior user interactions is possible.

Once one or more of these scores is determined, scoring module 270 determines a final weight value (or importance score) for each section based on a combination of the determined scores. For example, in some implementations, scoring module 270 calculates the final weight value based on a linear combination of logarithmic values of these scores. Content analyzer 230 then associates the weight value for each section with corresponding portions of the object model (T) generated by object model generator 220. In some implementations, content analyzer 230 also includes one or more preprocessing modules 240 which consolidate rich-format text nodes in the object model into single text nodes. For example, the content, <b> this is </b> a <i> term </i>, is consolidated into one text node: <text> this is a term </text>.

On subsequent crawls, object model generator 220 generates a hierarchical representation (T') of the latest version of resource 105 without rendering the resource. One or more mapping modules 260 then compare structural differences and content between the two object models to determine an appropriate mapping between content nodes and sections of the two object models. Based on this mapping, content analyzer 230 determines the section to which content nodes in T' correspond and associates the final weight value generated by scoring module 270 for sections in T with the corresponding content nodes in T'. Filter module 280 then filters out content associated with sections having a weight value and/or rendering information that fails to meet a threshold criterion (e.g., a minimum importance score), as well as sections that correspond to the previously identified noisy sections. In some implementations, content analyzer 230 determines a minimum importance score by calculating the mean (m) and deviation (d) of the importance scores associated with the identified noisy sections and a setting the minimum importance score to (m−c*d), where c is a constant. Filter module 280 then filters out noisy sections and sections having a weight value below the minimum importance score.

In this way, the importance of the content in the latest version of resource 105 can be determined by taking into account rendering information such as page layout and prominence within the layout, but without the costly exercise of rendering the latest version of the resource. Further, by associating rendered information with the latest version of resource 105, T can be used to compare subsequent versions (e.g., T'', T''', and so on) without rendering each of the intermediate versions. In instances where mapping modules 260 fail to determine an appropriate mapping between the object models (e.g., due to significant changes in content layout and page structure), content analyzer 230 renders the latest version of the resource (e.g., using rendering engine 210) and weight values and/or rendering information are updated and associated with corresponding sections of the object model.

Referring again to FIG. 1, once content analysis module 120 identifies the important updated content, snippet generation module 122 generates and ranks each snippet, removes noisy snippets, and expands the remaining snippets to contain relevant contextual information as described in more detail with respect to FIG. 4.

FIGS. 3 and 4 are flow diagrams of example techniques 300, 400 to enable the detection and analysis of updated content, and the generation of a feed in accordance with these implementations. As illustrated in FIG. 3, a resource is retrieved from a collection (301) (e.g., website 104 of FIG. 1) and is used to generate an object model (302), for example, DOM tree (T), as described above.

After, or optionally, before, the object model is generated, the resource is rendered (e.g., by rendering engine 210 of FIG. 2) to determine page layout characteristics and section attributes, and to evaluate the content and related information (303). The resource is segmented into sections (304) and information related to the rendered features and/or content is associated with each section and the corresponding nodes within the DOM tree (305). For example, as described above, a weight value is derived based on various features related to the resource and the particular section including, for example, rendered page layout characteristics, page content, page HTML tags, and page traffic, and associated with the corresponding content nodes within each section.

As described above, in some implementations, segmentation of the resource is performed using a text string matching algorithm or other unsupervised technique to group semantically similar sections together and weight values are assigned based on content signals and/or features of the rendered page. Some implementations include a combination of supervised and unsupervised techniques, enabling fine tuning of the classification operation. For example, in some implementations, a Support Vector Machine (SVM) or other classifier can be used with a set of human labeled data to segment resource 105 into sections and to determine which sections contain important information. This can be used to assign appropriate weight values to irrelevant content such as timestamps, click number, advertisements, navigation sections.

After the rendered page is segmented and corresponding values are associated with each section, the object model is indexed and stored (e.g., in resource index 112 or database 114 of FIG. 1, or other storage) (306). In some implementations, the object model and rendering information is updated at predefined intervals, including, for example, periodic intervals (e.g., weekly, biweekly, or other period), random intervals, and/or after detecting significant changes to the structure and/or content of the resource. The frequency of the update, in some examples, depends on the resource and/or request 109.

For purposes of clarity, various examples disclosed herein refer to an object model (T) for use in detecting content changes in a subsequent version of resource 105 (T') and the importance of those changes. However, the object model used to detect content changes may not always be the same object model used to determine the importance of those content changes. For example, in some instances, an object model, $T_{content}$, may be used as a base line to determine whether the most recent content provided by resource 105 has changed and an object model, $T_{rendered}$, may be used to determine whether any identified content changes are important. This is illustrated in the following example in which the predefined interval for rendering resource 105 is every 5 days (120 hours) and the crawl frequency for resource 105 is every 24 hours. On day one, resource 105 is crawled and an object model T1 is generated. In addition, resource 105 is rendered and rendered information is associated with T1 as described above with respect to FIG. 3. On day two, resource 105 is crawled a second time and an object model T2 is generated. T2 is then compared and mapped to T1 to determine if the content provided by resource 105 has changed. In addition, T2 is segmented into sections, which are then mapped to sections in T1 to determine the importance of any content changes within those sections. When no important content changes are detected, T2 is discarded. On day three, resource 105 is crawled again and an object model T3 is generated. T3 is then compared and mapped to T1 to determine if the content provided by resource 105 has changed. In addition, T3 is segmented into sections, which are then mapped to sections in T1 to determine the importance of any content changes within those sections. When important content changes are identified, a snippet is generated and provided to subscribers and T3 is indexed and stored, for example, in resource index 112 and database 114 of FIG. 1. On day four, resource 105 is once again crawled and an object model T4 is generated. T4 is then compared and mapped to T3 to determine if the content provided by resource 105 has changed since the last important change. In addition, T4 is segmented into sections, which are then mapped to sections in T1 (the last rendered version) to determine the importance of any content changes within those sections. When no important content changes are detected, T4 is discarded. On day five, resource 105 is crawled again and an object model T5 is generated. T5 is compared and mapped to T3 to determine if the content provided by resource 105 has changed since the last important change. In addition, in accordance with the predefined rendering interval, resource 105 is rendered, segmented into sections, and scored such that the calculated weights/scores are associated with corresponding sections as described above with respect to FIG. 3. T5 and the associated rendered information is then stored for use when determining the importance of subsequent content changes in resource 105. The newly generated importance scores are then used to determine the importance of any content changes between T5 and T3. When no important content changes are detected, no snippets are generated. On day six, resource 105 is crawled and an object model T6 is generated. T6 is then compared and mapped to T3 to determine if the content provided by resource 105 has changed since the last important change. In addition, T6 is segmented into sections, which are then mapped to sections in T5 (the last rendered version) to determine the importance of any content changes within those sections. When no important content changes are detected, T6 is discarded. If on day ten, the content provided by resource 105 is determined to have changed and those changes are determined to be important based on rendering information associated with the latest object model (T10), then subsequent comparisons for content changes and importance are determined based on the same object model, T10.

Thus, on days one through three, $T_{content}=T_{rendered}=T1$. After day three, $T_{content}=T3$ and $T_{rendered}=T1$. Then, on day five, $T_{content}=T3$, $T_{rendered}=T5$. Then, after day ten, $T_{content}=T_{rendered}=T10$. As illustrated by this example, the determination regarding the importance of a section (and the corresponding importance of a content change within that section) may therefore be based on rendered information associated with a version of resource 105 that is older, more recent, or the same as the version in which the most recent important change was detected.

Stored object models and rendering information provide a base line reference for subsequently crawled versions of resources 105 to detect important updated information. FIG. 4 illustrates a flow diagram of an exemplary technique for detecting differences by comparing the recently crawled versions of the resource to the stored information.

The recently crawled resource is first retrieved (401) and then used to generate an object model (402) representing the resource. For example, a DOM tree T' represents the latest version of the resource and may be one or more versions removed from the previously rendered and stored version of the resource represented by DOM tree T, where $T_{rendered}=T_{content}=T$. The two object models, T and T', are then compared to determine the content differences (403). In various implementations, content differences are determined using the Document Object Model difference (DOM Diff) algorithm described in more detail below. After identifying added or modified content in T', the object model is segmented into sections (404), for example, by grouping content nodes in T' into sections as described above with respect to FIG. 3. Sections in T' are then mapped to sections in T to determine the relative importance of each section in T' (405).

In some implementations, sections are mapped by using the Hungarian algorithm to calculate the best mapping between sections. For example, a cost associated with excluding content nodes in T' from sections associated with the corresponding pair node in T can be computed for multiple combinations of section mappings between T and T' to identify the best mapping. Once the best mapping is identified, weight values and rendered page layout information associated with content nodes and sections in T are associated with each section in T'. In this way, the overhead typically associated with rendering the current version of the resource can be avoided. This is particularly advantageous in cases where rendering the resource, e.g., a web page, requires fetching dozens files and invoking a rendering engine in a browser and/or where an objective of the system is to keep track of billions of web pages. Thus, mapping content nodes and sections between DOM trees T/T' enables page layout information for the updated resource to be determined using a version that was rendered days ago or weeks ago.

Partitioning the page into sections further allows updated content to be grouped together for presentation to the client device as a cluster of updates. For example, updated content within a "World News" section may be grouped together under a common heading in the text snippet provided by the web feed system. This provides a much better user experience than presenting individual updates separately. Furthermore, updates can be presented in a more concise fashion (e.g. presenting only a selective subset of updates). This may be an important factor for content providers (e.g. webpage authors), who prefer to limit the number of updates the system is allowed to display (similar to search snippets).

Referring again to FIG. 4, after sections in T and/or the corresponding weight values and layout information are associated with sections in T', updated content is filtered from further processing (406). For example, updated content nodes associated with sections having a weight value beyond a threshold (e.g., below a minimum threshold, above a maximum threshold) or associated with noisy sections are not used to generate snippets for the feed.

After the new or updated content has been identified and determined to be of sufficient importance, a contextually rich and human readable snippet is generated (407). This includes generating and ranking each snippet, removing noisy snippets, and expanding the remaining snippets to contain relevant contextual information.

For example, in various implementations, the generated snippets are ranked in order of importance so that the client devices (e.g., the consumers of the data) can easily truncate the snippets. For example, some client devices may be configured to display only the top 3 snippets. In some implementations, the snippets are ranked according to 3 major scores: (A) location within the page; (B) change size; and (C) section weight. Using the location within the page to score each snippet tends to keep the original order if the other scores are close. The section weight is determined by the section size as well as the most significant title/font of the section. In some implementations, the overall score is $A+\text{weight\_b}*\text{Log}(B)+\text{weight\_c}*\text{Log}(C)$.

After each snippet is ranked, a list of filters is used to filter out noisy snippets. These filters operate at the term level, and snippets for which a majority of the included terms are filtered by those filters are discarded. In some implementations, term level filters include two major groups. One group filters defined blacklist patterns, such as, for example, date patterns, time patterns, number patterns, and ad patterns. The second group filters low IDF terms. New term level filters can be added with minimal code change.

In addition to ranking and filtering the snippets, contextual information (e.g., a corresponding section title) is added to each snippet along with any necessary punctuation. The section title/subtitle is detected in two steps. In the first step, HTML tags and Cascading Style Sheets (CSS) style class ids are first checked for each text node to determine if it is a title node. In some implementations, a predefined text pattern is used to determine the CSS style class identifier. Once a text node is determined to be a title node, the header attribute is propagated above to the text node's ancestor nodes as long as it remains the only child node with non-empty content. In the second step, for a given content node (N), the title node is found by traversing up the DOM tree from N and stopping at the first node that satisfies both of the following conditions: (1) the node is marked as a head node and (2) the node is N's ancestor node or a left sibling of N's ancestor node.

As described above, in various implementations, content differences between the two object models, T and T', are determined using the DOM Diff algorithm. The DOM Diff algorithm tracks visible content changes determined to be of sufficient interest to users and ignores insignificant changes to structure or presentation by focusing primarily on image nodes and text nodes within each DOM tree. In some implementations, outgoing hyperlinks are treated as a special type of text node. Changes in the DOM tree, however, can complicate the detection of content changes since corresponding content fragments may be located in different portions of the DOM tree. Therefore, to identify content fragments that have been added, updated, and/or deleted, the DOM Diff algorithm can determine the optimal mapping between content nodes of the two DOM trees. Content node here refers to text nodes and image nodes. A mapping (M) of content nodes between DOM trees is a one-to-one function between contents nodes of T and T'. Nodes mapped to nothing are deleted nodes. Nodes in T' with no mapping node in T are newly added. The optimality of the mapping is derived from a cost function that determines the cost based on structure differences and visible content differences (e.g., those that would be perceived by the user if the resource was rendered) after the mapping.

Structure differences are mainly determined to capture changes in proximity among contents fragments after mapping. In contrast to the typical minimal edit distance approach used in searching for an optimal mapping of two trees (described below), measuring structure differences based on changes in proximity provides a measure of meaningful structure changes, independent of presentation options. For example, in determining content differences, a list of text content being represented as an ordered list, an unordered list, or a sequence of table rows it makes little difference if the list items are the same and are presented in a parallel fashion.

Proximity of two content nodes is determined using a distance function which is defined based on the shortest path between the two content nodes along tree edges (e.g. the path via the lowest common ancestor node). The structure cost represents the extent that the proximity relation changes after mapping. Generally, minimizing the structure cost keeps content nodes that are clustered together in the older version of the resource displayed in a similar way for the more recent version.

There are different ways for defining structure cost. In some implementations, structure cost is based on a pair-wise distance function and is defined as the sum of the absolute value of the difference in distance between each pair of close-by content nodes before and after the mapping M. In some implementations, 'close-by' nodes are two nodes having a distance (e.g., based on shortest path) between them that is less than or equal to a predefined threshold distance (e.g. eight). In some implementations, the threshold distance is an adjustable number.

In some implementations, the incremental structure cost for a pair of close-by nodes (n, p) after mapping (n', p')=|distance$^{-1}$/2|, where "distance" represents the change in proximity between the content nodes after the mapping (e.g., distance=distance(n',p')−distance(n,p), where distance(n,p) is equal to the shortest distance between nodes n and p in DOM tree T and distance(n',p') is equal to the shortest distance between nodes n' and p' in DOM tree T'). The inverse of the distance value is used based on the intuition that close-by neighbor nodes are typically more important than neighbors with long distance in HTML, e.g. structure changes at a sibling level are more important than those at the nephew level, and similarly change at a nephew level are more important than more distant nodes. The structure cost is divided by two to account for the cost being calculated from both ends of each pair.

The content difference represents a sum of the content changes between content nodes for each of the node mappings. In some implementations, the incremental cost associated with content differences between two nodes is the edit distance (at the term level) between text strings of a mapping between node n in T and a node n' in T'. For newly added nodes and deleted nodes, the edit difference is simply the length of the string (at the term level).

The total cost of tree mapping can be formulated as a linear combination of the structure cost and the content difference. The DOM Diff algorithm determines the optimal mapping between content nodes of the two DOM trees by searching for the minimal mapping cost.

FIG. 5 illustrates an exemplar technique for mapping content nodes of two DOM trees using the DOM Diff algorithm. The rationale behind the algorithm is based on the observation of content continuity in web documents (i.e., content typically changes gradually over a short period of time). Typically, there are many content fragments that stay the same between different versions of a web document (though their relative location within the document might change). When there are no (or very few) fragments that remain in the same DOM location between document versions, the page can be simply viewed as "completely changed". In such cases, the resource may be rendered and re-classified, for example, using the technique illustrated in the flow diagram of FIG. 3.

As illustrated in FIG. 5, determining a mapping having the minimal cost involves a few phases. In each phase, the previously calculated mapping is used for calculating structure cost for subsequent nodes. In the first phase, simple mappings are determined between nodes in T and nodes in T' with high confidence (e.g. unique long string that appears in both DOM trees, matching long strings having similar XPATHs, non-unique long strings with matching content at an equal distance from a mapped node) (501). For example, content nodes in T are mapped to corresponding content nodes in T' for nodes including a unique, long text string or image. Similarly, content nodes in T are mapped to content nodes in T' where both nodes have the same content with similar XPATHs. In some implementations, "similar XPATHs" means if branch numbers are removed from the path, the paths are the same, e.g., a path of Html[0]/body[1]/table[2]/tr[3]/td[5] is similar to Html[0]/body[1]/table[2]/tr[2]/td[6] because after the branch numbers are removed from the paths, both are Html/body/table/tr/td).

In the second phase, mappings are determined for relatively harder cases involving non-unique long strings that are close in proximity to mapped nodes in T from the first phase, with multiple occurrences but with exact matches (502). In other words, the second phase is used to map long strings that are not unique but whose location can be determined by the previous mapping of its neighbor nodes. Neighbor nodes include not only sibling nodes, but all nodes within a small distance (e.g. 4—but it is adjustable) of a mapped node or within the mapped node's "close-by" region. For example, if a content node (n) in T has a close-by neighbor (m) that has been previously mapped to m' in T', n will be mapped to n' in T' if the content of n' matches that of n and the distance(n, m)=distance(n', m'). In some implementations, the second phase is performed in order of decreasing string length and repeats itself until no additional node can be found.

In the third phase, the algorithm greedily maps the remaining nodes by finding node mappings that incur the minimum incremental cost based on both structure differences and content differences until the number of remaining nodes is under some threshold (503). In various implementations, this is performed by finding, for each mapped node n in T, any nodes that: 1) are not mapped yet; and 2) are within the close-by region of n. Nodes meeting this criteria are placed into a neighbor set and are then mapped to nodes in the close-by region of n' in T', one by one, minimizing the cost increment. For example, if p is a neighbor of mapped node n in T, the incremental mapping cost is calculated with respect to each unmapped node in the close-by region of n' in T' and then used to identify the mapping having the minimal incremental cost. After adding the incremental cost to the overall mapping cost, the third phase is repeated until the remaining nodes in T' cannot be mapped any further (i.e. these content nodes are new).

Figure 6:
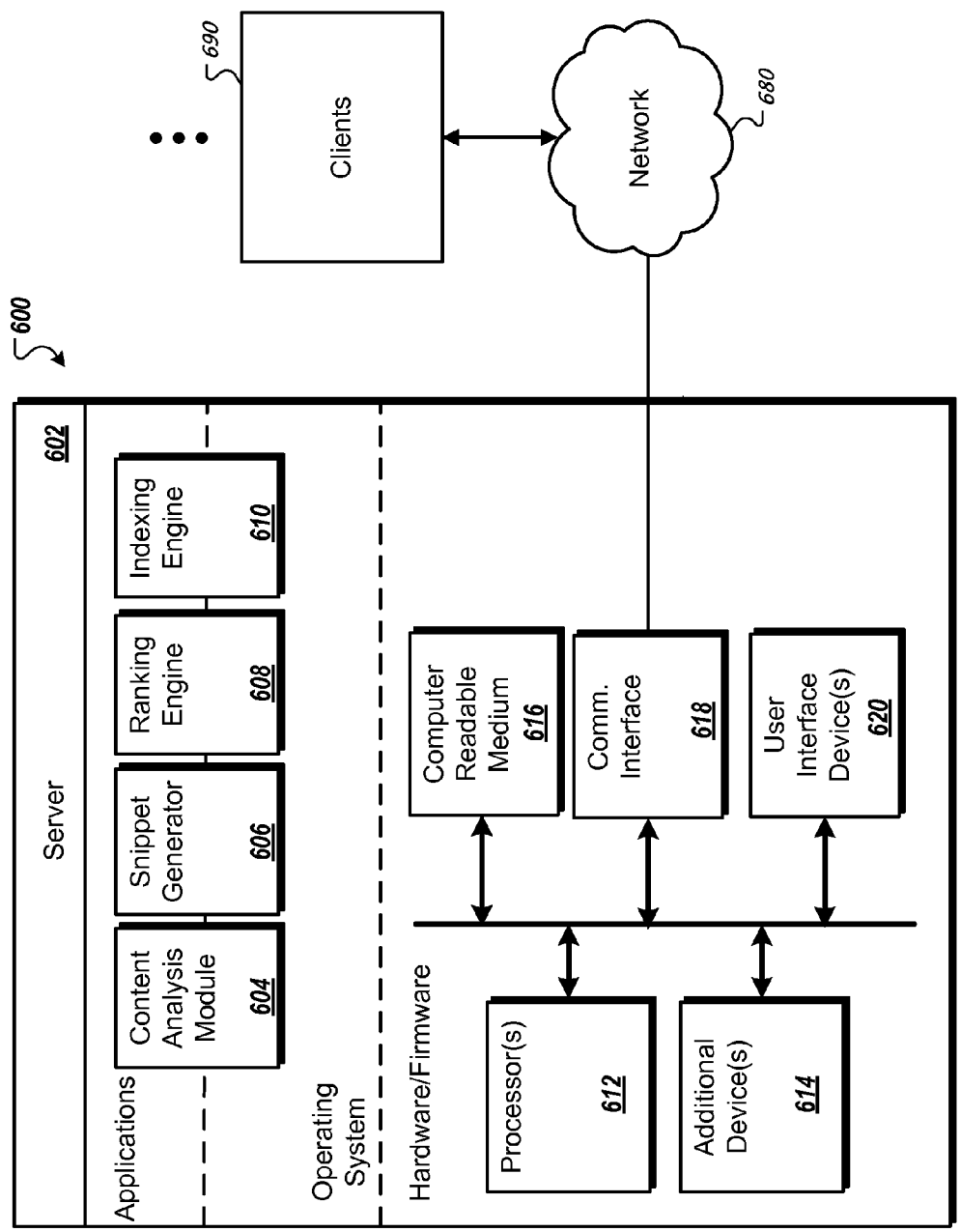
FIG. 6 is a schematic diagram of an example feed generation system.

In various implementations, the mapping technique illustrated in FIG. 6 includes one or more preprocessing steps to consolidate rich-format text nodes in T and T' into single text nodes (e.g. <b> this is </b> a <i> term </i> one text node: <text> this is a term </text>.) and/or to calculate the distance between each pair of content nodes in T.

In some implementations, the step of calculating distance of any pair nodes in T/T' can be done in O(e) with only one tree traversal, where e is total number of edges in DOM tree T. Overall, the algorithm above has a complexity of $O(n \times (n-n\_sm)+e)$ where n is the number of content nodes in DOM tree T, e is the number of edges in DOM tree T, n_sm is the number of nodes that can be mapped using the simple mapping strategy in the first phase. By monitoring the web page continuously, n is expected to be close to n_sm (i.e. n−n_sm=c) in most of cases, where c is a constant number. Therefore, for most of cases, the mapping algorithm has a complexity of O(n+e). If the DOM trees are compressed, the resulting edge number (e) should be at about the same level as the number of content nodes (n) (e.g., typically, the degree of each node is not unlimited).

FIG. 6 is a schematic diagram of an example system configured to continuously crawls the web, fetching resources from the internet, detecting updated content in resources, and generating feeds containing snippets of updated content, ranked according to their scores. The system generally consists of a server 602. The server 602 is optionally connected to one or more user or client computers 690 through a network 680. The server 602 consists of one or more data processing apparatus. While only one data processing apparatus is shown in FIG. 6, multiple data processing apparatus can be used. The server 602 includes various modules, e.g. executable software programs, including a content analysis module 604 for analyzing resources in order to detect and filter updated content, a snippet generator 606 for generating contextually rich snippets and filtering noisy snippets, a ranking engine for ranking resultant snippets in a feed, and an indexing engine 610.

Each module runs as part of the operating system on the server 602, runs as an application on the server 602, or runs as part of the operating system and part of an application on the server 602, for instance. Although several software modules are illustrated, there may be fewer or more software modules. Moreover, the software modules can be distributed on one or more data processing apparatus connected by one or more networks or other suitable communication mediums.

The server 602 also includes hardware or firmware devices including one or more processors 612, one or more additional devices 614, a computer readable medium 616, a communication interface 618, and one or more user interface devices 620. Each processor 612 is capable of processing instructions for execution within the server 602. In some implementations, the processor 612 is a single or multi-threaded processor. Each processor 612 is capable of processing instructions stored on the computer readable medium 616 or on a storage device such as one of the additional devices 614. The server 602 uses its communication interface 618 to communicate with one or more computers 690, for example, over a network 680. Examples of user interface devices 620 include a display, a camera, a speaker, a microphone, a tactile feedback device, a keyboard, and a mouse. The server 602 can store instructions that implement operations associated with the modules described above, for example, on the computer readable medium 616 or one or more additional devices 614, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   identifying pairs of document object model content nodes where a first content node in each pair is in a first hierarchical representation of a first document and a second content node in each pair is in a second hierarchical representation of a second document, in which the content nodes represent visible content and in which identifying comprises:
      selecting the first and second content nodes such that a cost based on structural differences between the first and second hierarchical representations and a content difference between the first and second content nodes is minimized, wherein the cost is based on, at least, a distance of a shortest path between the first and second content nodes given a common ancestor node in the document object model;
   associating rendered layout information related to the first content node with the second content node; and
   determining whether to generate a snippet for the content difference between the first and second content nodes based on the rendered layout information.

2. The method of claim 1 further comprising generating a snippet for the content difference.

3. The method of claim 1 in which identifying the pairs of content nodes comprises:
   determining a first distance between the first content node and a neighboring content node having a corresponding paired node in the second hierarchical representation;
   determining a second distance between the second content node and the paired node; and
   calculating an incremental cost based on a difference between the first distance and the second distance in combination with the content difference.

4. The method of claim 3, in which the second content node is selected from a group of content nodes within a third distance from the paired node, and identifying the pairs of content nodes further comprises determining the incremental cost is less than incremental costs associated with other content nodes within the group of content nodes.

5. The method of claim 1 in which minimizing the cost comprises:
   determining multiple incremental costs, each based on pairing an unmapped content node of the first hierarchical representation with an unmapped content node of the second hierarchical representation, the unmapped content nodes of the first and second hierarchical representations being within a distance of corresponding content nodes of an identified pair; and
   mapping the unmapped content node of the first hierarchical representation with the unmapped content node of the second hierarchical representation if the pairing results in a minimum incremental cost.

6. The method of claim 1 in which the second document is a version of the first document.

7. The method of claim 1 in which the rendered layout information associated with the first content node comprises an assigned weight value derived from rendering the first document, the weight value satisfying a threshold criterion.

8. The method of claim 1 further comprising determining an assignment between groups of content nodes in the first hierarchical representation and groups of nodes in the second hierarchical representation using the Hungarian algorithm.

9. The method of claim 1 in which the rendered layout information is an importance score associated with a group of nodes to which the first content node belongs, the method further comprising deriving the importance score based on visual layout information related to a rendering of the first document, query information associated with the first document, or a combination thereof.

10. A non-transitory computer storage medium encoded with a computer program, the program comprising instructions that when executed by data processing apparatus cause the data processing apparatus to perform operations comprising:
    identifying pairs of document object model content nodes where a first content node in each pair is in a first hierarchical representation of a first document and a second content node in each pair is in a second hierarchical representation of a second document, in which the content nodes represent visible content and in which identifying comprises:
       selecting the first and second content nodes such that a cost based on structural differences between the first and second hierarchical representations and a content difference between the first and second content nodes is minimized, wherein the cost is based on, at least, a distance of a shortest path between the first and second content nodes given a common ancestor node in the document object model;
    associating rendered layout information related to the first content node with the second content node; and
    determining whether to generate a snippet for the content difference between the first and second content nodes based on the rendered layout information.

11. The computer storage medium of claim 10 further comprising generating a snippet for the content difference.

12. The computer storage medium of claim 10 in which identifying the pairs of content nodes comprises:
    determining a first distance between the first content node and a neighboring content node having a corresponding paired node in the second hierarchical representation;
    determining a second distance between the second content node and the paired node; and
    calculating an incremental cost based on a difference between the first distance and the second distance in combination with the content difference.

13. The computer storage medium of claim 12, in which the second content node is selected from a group of content nodes within a third distance from the paired node, and identifying the pairs of content nodes further comprises determining the incremental cost is less than incremental costs associated with other content nodes within the group of content nodes.

14. The computer storage medium of claim 10 in which minimizing the cost comprises:
    determining multiple incremental costs, each based on pairing an unmapped content node of the first hierarchical representation with an unmapped content node of the second hierarchical representation, the unmapped content nodes of the first and second hierarchical representations being within a distance of corresponding content nodes of an identified pair; and
    mapping the unmapped content node of the first hierarchical representation with the unmapped content node of the second hierarchical representation if the pairing results in a minimum incremental cost.

15. The computer storage medium of claim 10 in which the second document is a version of the first document.

16. The computer storage medium of claim 10 in which the rendered layout information associated with the first content node comprises an assigned weight value derived from rendering the first document, the weight value satisfying a threshold criterion.

17. The computer storage medium of claim 10, the operations further comprising determining an assignment between groups of content nodes in the first hierarchical representation and groups of nodes in the second hierarchical representation using the Hungarian algorithm.

18. The computer storage medium of claim 10 in which the rendered layout information is an importance score associated with a group of nodes to which the first content node belongs, the operations further comprising deriving the importance score based on visual layout information related to a rendering of the first document, query information associated with the first document, or a combination thereof.

19. A system comprising:
a computer-readable storage device including instructions; and
one or more data processing apparatus operable to execute the instructions and perform operations comprising:
identifying pairs of document object model content nodes where a first content node in each pair is in a first hierarchical representation of a first document and a second content node in each pair is in a second hierarchical representation of a second document, in which the content nodes represent visible content and in which identifying comprises:
selecting the first and second content nodes such that a cost based on structural differences between the first and second hierarchical representations and a content difference between the first and second content nodes is minimized, wherein the cost is based on, at least, a distance of a shortest path between the first and second content nodes given a common ancestor node in the document object model;
associating rendered layout information related to the first content node with the second content node; and
determining whether to generate a snippet for the content difference between the first and second content nodes based on the rendered layout information.

20. The system of claim 19 further comprising generating a snippet for the content difference.

21. The system of claim 19 in which identifying the pairs of content nodes comprises:
determining a first distance between the first content node and a neighboring content node having a corresponding paired node in the second hierarchical representation;
determining a second distance between the second content node and the paired node; and
calculating an incremental cost based on a difference between the first distance and the second distance in combination with the content difference.

22. The system of claim 21, in which the second content node is selected from a group of content nodes within a third distance from the paired node, and identifying the pairs of content nodes further comprises determining the incremental cost is less than incremental costs associated with other content nodes within the group of content nodes.

23. The system of claim 19 in which minimizing the cost comprises:
determining multiple incremental costs, each based on pairing an unmapped content node of the first hierarchical representation with an unmapped content node of the second hierarchical representation, the unmapped content nodes of the first and second hierarchical representations being within a distance of corresponding content nodes of an identified pair; and
mapping the unmapped content node of the first hierarchical representation with the unmapped content node of the second hierarchical representation if the pairing results in a minimum incremental cost.

24. The system of claim 19 in which the second document is a version of the first document.

25. The system of claim 19 in which the rendered layout information associated with the first content node comprises an assigned weight value derived from rendering the first document, the weight value satisfying a threshold criterion.

26. The system of claim 19, the operations further comprising determining an assignment between groups of content nodes in the first hierarchical representation and groups of nodes in the second hierarchical representation using the Hungarian algorithm.

27. The system of claim 19 in which the rendered layout information is an importance score associated with a group of nodes to which the first content node belongs, the operations further comprising deriving the importance score based on visual layout information related to a rendering of the first document, query information associated with the first document, or a combination thereof.

* * * * *